July 11, 1939.  U. KÖLM  2,165,278
GRAPH PRINTING TABULATOR
Filed Sept. 30, 1933  3 Sheets-Sheet 1
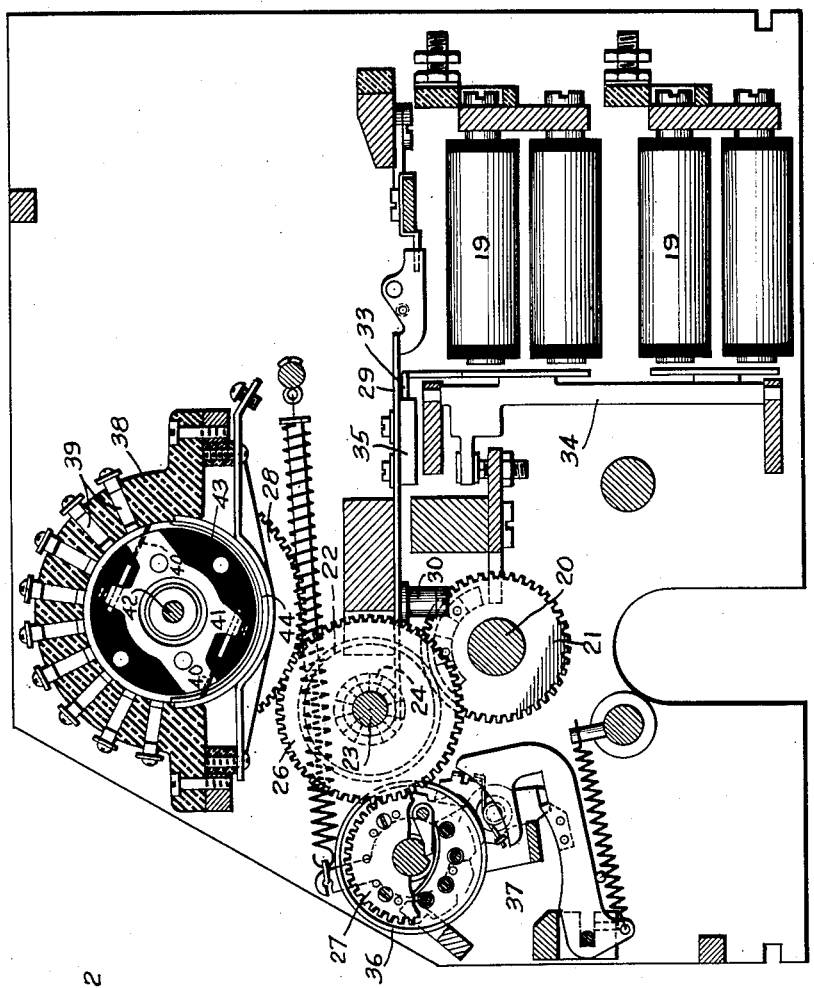
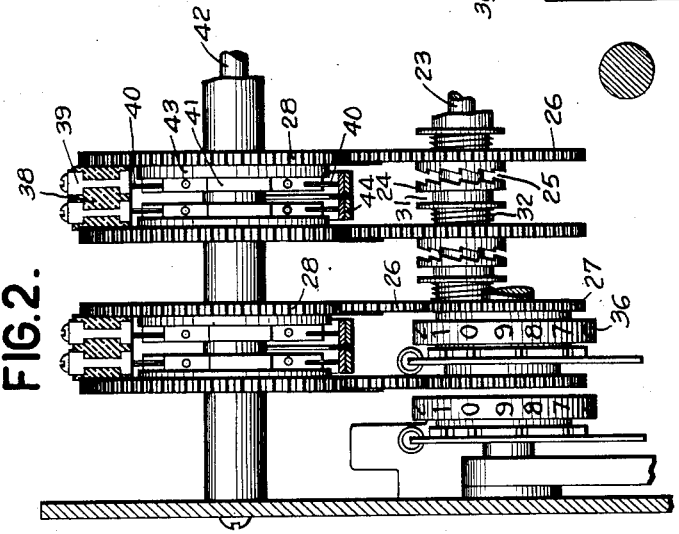
INVENTOR
Ulrich Kölm
BY
W. M. Wilson
ATTORNEY July 11, 1939.  U. KÖLM  2,165,278
GRAPH PRINTING TABULATOR
Filed Sept. 30, 1933   3 Sheets-Sheet 2
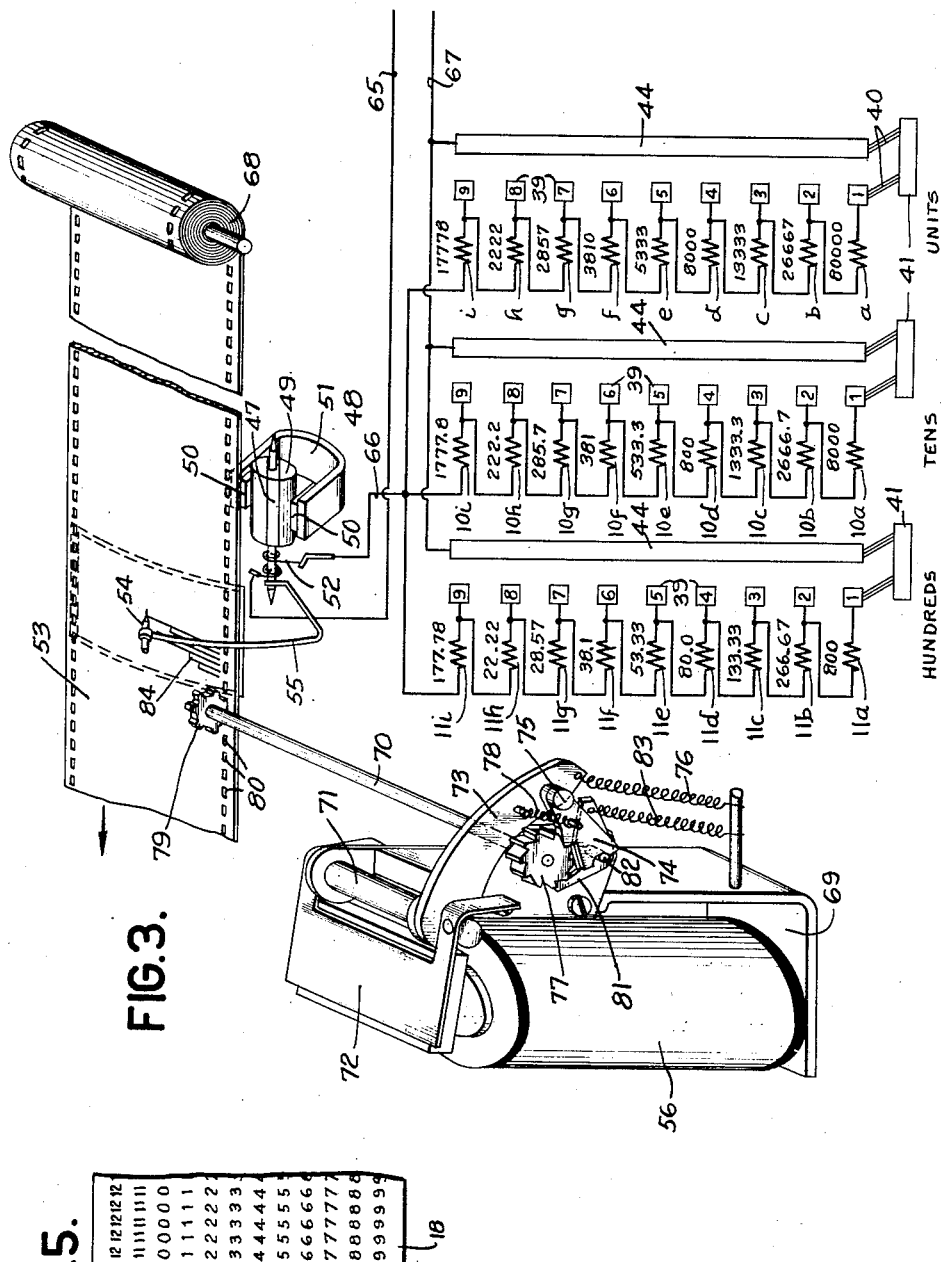

July 11, 1939. U. KÖLM 2,165,278
GRAPH PRINTING TABULATOR
Filed Sept. 30, 1933 3 Sheets-Sheet 3

Patented July 11, 1939

2,165,278

UNITED STATES PATENT OFFICE 2,165,278

GRAPH PRINTING TABULATOR

Ulrich Kölm, Berlin-Lankwitz, Germany, assignor to International Business Machines Corporation, New York, N. Y., a corporation of New York Application September 30, 1933, Serial No. 691,589
In Germany November 14, 1932

13 Claims. (Cl. 235—61.9)

This invention relates to devices for printing graphs under control of an accounting machine.

An object of the invention is to provide devices in a record card controlled machine for printing a graph representing an amount or a total of amounts entered into said machine. A series of such printing operations may be recorded in succession with the resulting formation on a record sheet of a curved line representative of the fluctuations in the data.

A further object of the invention is to provide means to record graphically by a single mark the summation of amounts in more than one denominational order. A plurality of sets of graduated resistances are arranged in an accumulator and in series with a recording galvanometer which is operated differentially to record values graphically according to the selection of resistances in the various denominational orders as determined by the data registered by the accumulator. In other words, a marking arm of the galvanometer is adjusted according to the value of an electrical force which in turn is regulated by the interposing of graduated resistances selected by data entering devices in the machine.

A feature of the invention is the principle involved in the selective employment of graduated resistances for the manifestation of variation in data.

Another object of the invention is to provide an accounting machine with a galvanometer which is sensitive and responsive to changes in electromotive force and equipped with a tracing point for drawing or printing a graph to record the changes in the electromotive force which varies with the change in data handled by the machine.

These and other objects of the invention are apparent as the present specification is read with reference to the drawings which accompany and form part of the specification.

In the drawings:

Fig. 1 is a sectional elevation view taken through the accumulating section of the machine and showing the commutator devices which are provided for reading the amounts entered into the accumulator.

Fig. 2 is a front view of the mechanism shown in Fig. 1. The commutator segments are shown in section.

Fig. 3 is a perspective view of the graph printing galvanometer and record feeding device with the connected graduated resistances shown diagrammatically.

Fig. 5 is a detail view of a portion of a perforated record card.

Figure 4:
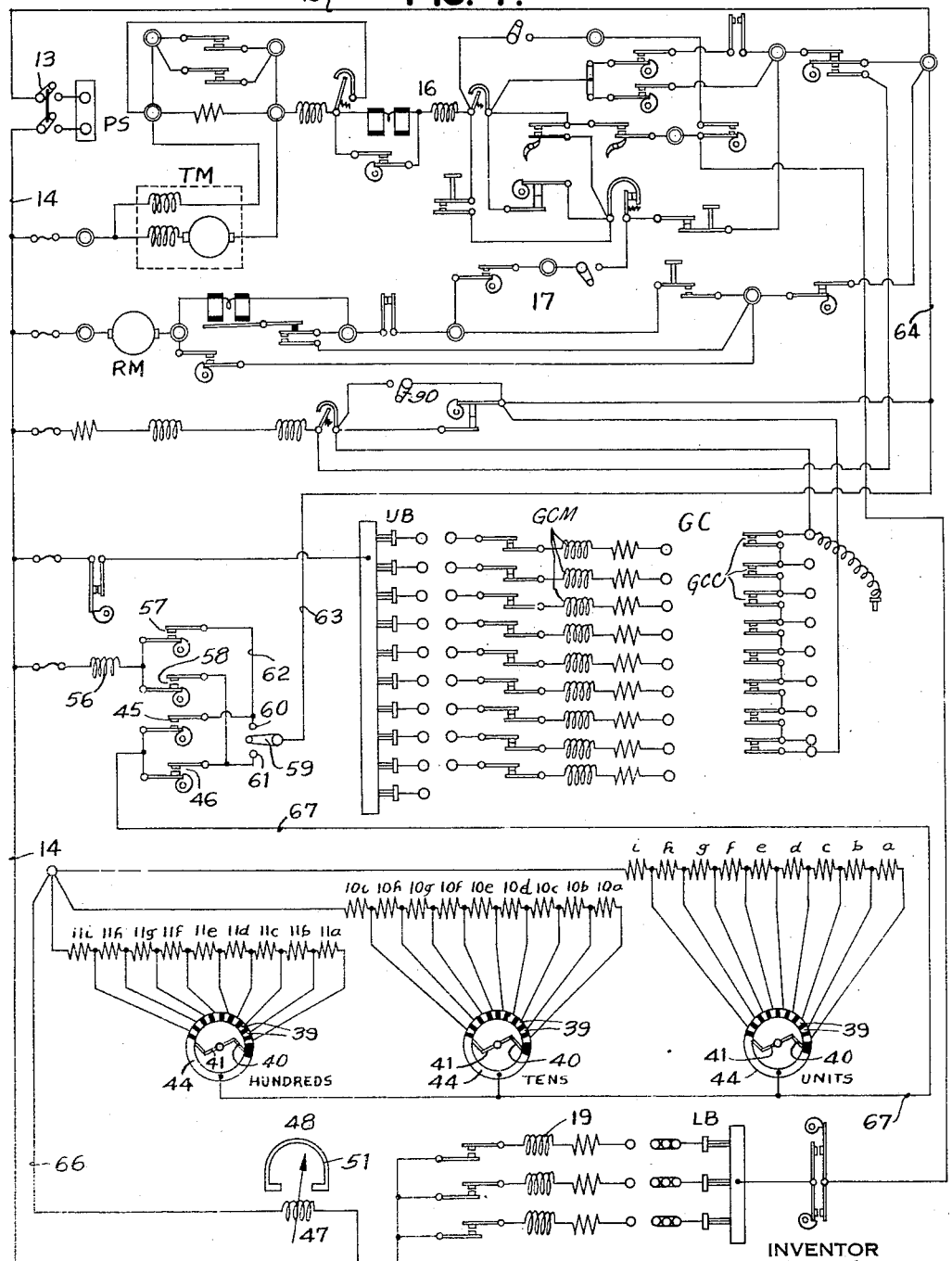
Fig. 4 is a wiring diagram of the machine.

The tabulating accounting machine in which the devices of the present inventions are incorporated is well known and generally of the kind described in Patent No. 1,762,145 to G. F. Daly, et al.; so that for a detailed explanation of the ordinary features of the machine not especially concerning the present invention, reference may be made to that patent.

In Fig. 4 it is seen that closing switch 13 connects the lines 14 and 15 to the power source PS and conditions the machine for operation. The machine is driven by a tabulating motor TM controlled by circuits connected to keys, cams and relays indicated generally at 16. During a total taking cycle the machine is operated by a resetting motor RM which is controlled by keys, cams and relays in circuits indicated at 17.

The machine is controlled by data entered on the well known form of perforated record cards wherein the differential placement of the perforations certain distances from a reference edge of the card 18, Fig. 5, determines the magnitude of data in a plurality of columns or orders. The card shown is perforated to represent the number 628.

When the tabulating motor TM is effective it operates to feed the record cards in the usual manner. The cards are fed first under the upper brushes UB and then under the lower brushes LB exactly one machine cycle later. The two sets of brushes may be connected by the usual comparing group control devices GC so that data on separate card groups may be accumulated and recorded separately, the machine taking a total on each change in group.

As a perforated card 18 passes under the lower brushes LB, differentially timed impulses are directed through the opening in the card, the brushes and the accumulator control magnets 19, Figs. 1 and 4. The magnets control the adding mechanism shown in Figs. 1 and 2 in the usual way to enter the amounts represented by the perforations into the adding wheels.

Referring to Fig. 1, a driving shaft 20 is operated by the tabulating motor TM whenever the latter is in operation. Through gears 21 and 22 the shaft 20 drives shaft 23 upon which are slidably mounted driving clutch elements 24. Each element 24 cooperates with clutch teeth 25 on an accumulator driving gear 26 loosely mounted on shaft 23 and in mesh with an accumulator gear 27 and a commutator driving gear 28. One end of a lever 29 pivoted at 30 projects into a circumferential groove 31 in the clutch element 24, both the lever and the element being urged by spring 32 to shift clutch element 24 into driving engagement with the teeth 25 on gear 26. The clutch is prevented from engaging by an extension 33 on the armature 34 of magnet 19. The extension cooperates with a block 35 on lever 29 and normally holds the lever with the clutch element to the left, Fig. 2.

Each magnet 19 is energized at a differential time in the cycle according to the location of a perforated index point on the controlling card, and when energized it attracts the armature 34, moving the extension 33 thereon out of engagement with block 35 and permitting spring 32 to push clutch element 24 into driving engagement with the accumulating gear 26. Thereupon the accumulator gears are rotated for a number of steps until at a given point near the end of the cycle, suitable restoring mechanism shifts the lever 29, element 24 and armature 34 back to original positions wherein the armatures hold the levers with the clutch elements out of operative position. In this manner the gears 26, 27 and 28 assume positions corresponding to the data represented by the perforated index points on the controlling record cards.

Each gear 27 has attached thereto an indicating wheel 36 with numerals which exhibit the amount or total of amounts entered into the accumulator.

A transfer mechanism at 37 serves to carry units from lower to higher orders in a well known manner.

A reading out device is provided for sensing the data registered in the accumulator and controlling the printing of a record of such data. It takes the form of the commutator devices shown at the top of the views in Figs. 1 and 2. The gear 28 serves to adjust the movable members of the reading out device. The commutator comprises an insulation section 38 into which contact segments 39 are inserted, the segments corresponding in number and arrangement to the various digit indicating positions of the accumulating gear wheels. Cooperating with the segments are the brushes 40 of a carrier plate 41 loosely mounted with shaft 42 as a center. The plate 41 is connected to gear 28 but insulated therefrom by a washer 43 between the two. As one of the two brushes 40 on the plate touches any of the segments 39, the other brush wipes over a common semicircular contact plate 44.

It may be noted in Fig. 2 that the various orders are similar in construction, the only differences arising because section 38 and plate 44 are adapted to cooperate with two banks or orders in saving space.

The contact segment 39 of the various orders of an accumulator are connected through graduated resistances to the cam contacts 45 or 46, Fig. 4, with a main conductor of the machine circuit, as explained hereinafter with reference to the wiring diagram. As noted in Figs. 1, 3 and 4, each commutator is equipped with nine contact segments 39, corresponding to the digit values "1" to "9" of the accumulator wheels. The units order contact segment 39 corresponding to the digit value "1" is connected with the segment corresponding to the digit "2" by a resistance $a$. The "2" segment is connected with the next segment through a resistance $b$, and the other segments are connected in a similar fashion with various resistances, the segment 39 corresponding to the digit value "9" is connected through a resistance $i$ with one end of the coil 47 of a galvanometer 48 with a moving coil system. In a similar way the tens order segments 39 are connected through resistances $10a$—$10i$, and the hundreds order segments 39 are connected through resistances $11a$—$11b$ to the same galvanometer 48.

The resistances $a$ to $i$ coordinated within the various series or groups relating to the units, tens and hundreds orders, are graduated for electrical conductivity according to the hyperbola function $$Y = \frac{C}{X}$$

while the series with relation to each other are stepped up or graduated in regular arithmetical order, i. e. differing from adjacent orders by a multiple of ten. The constant C is assumed to be 160,000 ohms for the resistance of the units commutator in the present embodiment. Therefore, the tens order resistance is 16,000 ohms and the hundreds order resistance 1,600 ohms. In certain positions of the commutator, a plurality of the resistances have a concerted effect. For example if the brush 40 in the units order is resting upon the contact segment 39 relating to the value "1", then the entire resistance of 160,000 ohms is entered into the circuit of the galvanometer.

In the event that the same brush 40 rests upon the segment "5", the resistances $e$ to $i$ inclusive enter into the circuit with the resulting ohmage according to the function $$Y = \frac{C}{X} = \frac{160,000}{5} = 32,000$$

or a resistance of 32,000 ohms.

It is noted that the "9" segments 39 of the various orders are connected in parallel to the galvanometer, so that when the circuit is closed a total resistance R is formed within the circuit. The total resistance R may be figured from the well known relationship:

$$\frac{1}{R} = \frac{1}{r_1} + \frac{1}{r_2} + \frac{1}{r_3} \ldots \text{etc.}$$

where $r_1$, $r_2$, and $r_3$ are the partial resistances in the various denominational orders.

The galvanometer 48 shown in Fig. 3 is provided with a cylinder 49 which is adapted to rotate between the pole-shoes 50 of a permanent magnet 51 when the coil 47 of the cylinder 49 is energized. Then a torsional moment is urging the cylinder as the lines of force of the coil field have a tendency to flow in parallel with the power lines of the permanent magnet. However, the angle of rotation of the cylinder will be limited because an attached spring 52 acts in the opposite direction. The angle of rotation will be larger the stronger the current flowing through coil 47. The movement of the cylinder 49 is recorded on a record strip 53 by a marking pencil or printing point 54 carried on a marking arm 55 fastened to the spindle of the cylinder.

The feeding of the record sheet or strip 53 may be performed selectively under control of a magnet 56 which is energized on each item entering operation or only on total taking operations. Thus, a graph may be printed either to represent a series of items or a series of totals. In line with the magnet 56, Fig. 4, are a pair of cam contacts 57 and 58. These contacts are connected in multiple with the other cam contacts 45 and 46 which are in series with the galvanometer 48 and the reading out commutators and resistances. The contacts 45 and 57 are controlled by cams on shaft 23, Fig. 1, so that they are closed for every item entering operation. The closing of these contacts 45 and 57 is arranged to occur shortly after the positioning of brushes 40—41 in the adding portion of an item entering operation.

The other contacts 46 and 58 are controlled by cams on a total taking shaft operated by motor RM. They close during the first part of the total taking cycle before the second half of the cycle during which resetting is performed. By means of a switch 59, selection may be made of either pair of contacts. If the switch is raised to contact the terminal 60, the galvanometer coil 47 and feeding control magnet 56 are energized under control of contacts 45 and 57 respectively. The circuit through the paper feeding magnet may be traced from the line 14, through magnet 56, contacts 57, wire 62, terminal 60, switch 59 now closed, and wires 63 and 64 to the other line 15. The circuit through the galvanometer may be followed from line 14, through wire 65, galvanometer coil 47, wire 66, then in multiple through the selected resistances, the segments 39, brushes 40, frames 41, and contact plates 44, then through wire 67, contact 45, terminal 60, switch 59 and wires 63 and 64 to line 15. With the switch 59 closed on terminal 60, either of two forms of item graph recording operation may take place according to whether the items are separate distinct data arranged on cards of differing classification, or the items are of a related nature presented on groups of cards of similar classification. If the items are distinct in classification, the usual group control devices sense this and initiate an accumulator resetting operation after the recording of each item. During the resetting operation there is no total recording operation on the graph, because contacts 45 are open while resetting takes place. Thus, separate items are graphically represented item by item across the graph sheet. In the other instance, when the items are in related groups, item will be added to item as the data of a related group is added; the graph record thereof will start with a representation of the first item of a group followed by successive progressive total representations of the added first and second items, the first, second and third items, etc. If the switch 59 is lowered to contact terminal 61, the graph printing devices are operated under control of contacts 46 and 58 which operate only on total taking cycles. With the switch 59 in the position shown in Fig. 4, the graph printing devices are disabled but the ordinary tabulating operations may be effected in the usual way.

Because of the presence of group control devices revealed in Patent No. 1,762,145 referred to hereinbefore, it is the natural action of the machine used in the present invention to initiate a total taking and resetting operation after each item entering operation, if the group control devices are connected in the control circuit as shown in Fig. 4. There it is noted that the switch 90 is open and the contacts GCC are in series in the tabulating motor control circuit and magnets GCM are not plugged between the upper and lower card sensing brushes. With the control circuits arranged in this way, the contacts GCC fail to close after each item entering operation and the usual automatic total taking cycle is initiated to reset the accumulators before the resuming of the next item entering operation.

On tabulating operation, as distinguished from item printing operation, automatic control of the time in which a total taking and resetting operation is called in, may be carried on in either of two ways. Either the switch 90 is closed and the machine runs until stopped by hand operation of a stop key, or the control is arranged so that the GCM magnets are plugged between the upper and lower brushes in the usual way to sense group numbers on records and automatically stop the machine on the appearance of group change to take a total before adding a new group. In this way, after setting the graph recording controlling switch 59 to touch the contacts 61, a series of items is added without printing and only the total is recorded.

When the magnet 56 is energized, the mechanical connections shown in Fig. 3 are operated to feed the graph record strip 53 off the roll 68. A bracket 69 supporting the magnet 56 provides bearings for a feed shaft 70 and an armature shaft 71. Secured to shaft 71 is the armature block 72 which rocks when attracted to the magnet, thus turning the shaft. Attached to the shaft 71 is a feed operating arm 73 carrying a feed pawl 74 pivoted at 75. A spring 76 drawn between the end of arm 73 and a stud on bracket 69 normally holds the arm lowered and the armature block raised. The pawl 74 is held into cooperation with a ratchet wheel 77 on shaft 70 by a spring 78 between the pawl and arm 73. When the magnet 56 is deenergized, the arm 73 is lowered by spring 76 and pawl 74 operates wheel 77 to turn shaft 70.

At the opposite end of shaft 70 is a paper feeding gear wheel 79 the teeth of which engage in a series of apertures 80 lined along the edge of sheet 53 for feeding the same off the roll 68 in the direction of the arrow. As the sheet passes the printing position it is supported by a curved backing plate which arranges it to conform with the arc of the printing point 54. A detent 81 pivoted on pin 82 is urged by spring 83 to engage the teeth on ratchet 77 to hold the paper strip 53 in shifted position. The end of pawl 74 abuts against pin 82 and acts as a stop to limit the movement of arm 73 as drawn down by spring 76.

The operation of the machine may be explained with reference to the wiring diagram in Fig. 4. During the passage of the record cards under the lower analyzing brushes LB, the perforations therein are analyzed and the data entered into the accumulators controlled by magnets 19. The illustration shows three orders of accumulating wheels, each of which is coordinated with a commutator 39, 40. Through the gearing connections between gears 26, Fig. 1, of the accumulating wheels and gears 28 of the commutators, the brushes 40 are always on the contact segments 39, Fig. 4, corresponding to the positions of the accumulating wheels, and thereby a circuit is directed as follows: from the main line 15, wires 64 and 63, switch 59, contacts 45 or 46 according to the position of the switch 59, wires 67, the contact plates 44 in the units, tens and hundreds commutators, the brushes 40 and frames 41, contact segments 39, and through the selected resistances, wire 66, coil 47 and wire 65 to the line 14. At the appropriate time in the machine cycle, the contact 45 or 46 is closed, the coil 47 is energized and the cylinder 49, Fig. 3, is displaced an amount corresponding to the current flowing through the circuit. The arm 55 and the marking point 54 are moved along and displaced correspondingly so that a length of line proportional to the magnitude of the data is drawn on the graph sheet. In the present form of embodiment of the device, the data value to be indicated is represented by the configuration 84, wherein the displacement of the cylinder 49 determines the height of the ordinates and the operation of the paper feed gear 79 marks the coordinate point and determines the length of the abscissa in Cartesian coordinates.

The angle of deflection of the cylinder 49 is proportional to the current flowing through the coil 47. For example, if the digit values 752 and 188 are to be registered, the relation of the one to the other is as 4:1; therefore, the currents flowing through coil 47 on successive registrations of these numbers should be proportioned as 4:1. The current values may be figured as follows:

The total resistance on the registration of the figure 752 is to be calculated according to the following relation:

$$\frac{1}{R} = \frac{1}{r_1} + \frac{1}{r_2} + \frac{1}{r_3}$$

Since the brush 40 in the commutator coordinated with the units order touches the contact segment 39 of the digit "2", there is placed in the circuit the resistances $b$ to $i$ inclusive, resulting in the total ohmage of 80,000 ohms. The brush of the commutator in the tens position touches the contact segment 39 corresponding to the digit "5", thereby cutting in the resistances $10c$ to $10i$ with a total of 3,200 ohms. Through the brush of the hundreds order commutator, the resistances $11g$ to $11i$ are brought in with a total of 228.57 ohms. Entering these values in the equation and there results:

$$\frac{1}{R_1} = \frac{1}{228.57} + \frac{1}{3200} + \frac{1}{80,000} \text{ and } R_1 = 212.5 \text{ ohms}$$

Figuring the total resistance $R_2$ resulting from the entry of the amount 188:

$$\frac{1}{R_1} = \frac{1}{1600} + \frac{1}{2000} + \frac{1}{20000} \text{ and } R_2 = 850 \text{ ohms}.$$

If a voltage of 100 volts is assumed, the respective currents may be figured.

$$I_1 = \frac{100}{212.5} = 0.47 \text{ amperes}$$

$$I_2 = \frac{100}{850} = 0.1175 \text{ amperes}$$

Therefore, the relation of the current in the two examples is the same as the proportional magnitude of the two amounts 752 and 188, namely 4:1. By directing such regulated current through the recording galvanometer a graphical record of the data is produced as explained hereinbefore.

Since the basic novel features of the invention are shown and described it will be understood that various omissions, substitutions and changes in the form and details of the devices illustrated, and changes in operation may be made by those skilled in the art without departing from the spirit of the invention. It is the intention, therefore, to be limited only as indicated by the scope of the following claims.

What is claimed is:

1. In an accounting machine, means for receiving data comprising a plurality of denominational order elements, an electric recording control circuit, a number of graduated resistances adapted to be connected selectively in said electric circuit, means under control of said receiving elements for selectively connecting certain of said resistances in said circuit according to the multidenominational data received, and means in said circuit controlled by the current flowing through the circuit for making a graphical record of the date.

2. In a machine of the class described, a plural ordered data receiving device, a series of sets of graduated resistances, one set for each order, electrical contact making devices one for each order for selectively making an effective number of resistances in each order, the number of resistances selected varying according to the magnitude of the data received in the order, means under control of the receiving device for adjusting the contact making devices, and means under control of the selected resistances for making a record of the magnitude of the data in the receiving device.

3. In a machine of the class described, an accumulator comprising a plurality of denominational elements for adding values, an electric control circuit, a series of graduated resistances adapted to be connected in said circuit, means under control of the various denominational order elements of said accumulator for connecting certain of said resistances in said circuit according to the magnitude of the multidenominational value accumulated, and other means in said circuit controlled by the flow of current therethrough for marking a graphical record of the accumulated value.

4. In a graph printing device operated under control of records with indicia representing data values, means for sensing said indicia on said records, a galvanometer with a movable printing point for marking on a record sheet, electrical devices for varying the electric current directed through the galvanometer and thus adjusting the point, and means under control of said sensing means for setting said electrical devices to select currents influencing the galvanometer and pointer to mark on said sheet graphical representations of the data values sensed on the records.

5. In a machine of the class described, an accumulator comprising a plurality of denominational order elements for receiving amounts, commutator devices each of which is adjusted by a related accummulator element according to the amounts registered in said accumulator, an electric circuit, graduated resistances cut into said circuit selectively by said commutator devices to vary the current therein, a galvanometer in said circuit provided with a movable marking arm cooperating with a graph sheet to make ordinate marks of variable length according to the magnitude of the multidenominational amounts accumulated, and means for feeding the graph sheet between operations of the galvanometer and at right angles to the ordinate markings for abscissa spacing in Cartesian coordinates.

6. In a machine of the class described an accumulator comprising a plurality of denominational orders for receiving amounts, a plurality of commutators, one associated with each order in said accumulator, contact segments in said commutators, one for each digit, brush frames in said commutators adjustable to contact the segments corresponding to the amount registered in said accumulator, a plurality of sets of graduated resistances connected to the segments, the ohmage of resistances connected in each set varying inversely as the value of the amount in the related accumulator order, and the ohmage between sets differing by multiples of ten, an electric circuit in which the sets of resistances are connected in multiple through the brush frames, with the resistances in each set arranged in series, and a galvanometer in said circuit controlled by the variable current and adapted to print a graphical record of the amounts on a record sheet.

7. In a machine of the class described, an electric circuit, an accumulator for receiving items and computing totals, adjustable connections for said electric circuit, a series of graduated resistances adapted to be connected selectively in said circuit by said adjustable connections, means under control of said accumulator for adjusting said connections to vary the amount of current flowing in said circuit according to the magnitude of the item or total registered in said accumulator, and a galvanometer in said circuit adapted to make a graphical record of the item or total on a record sheet.

8. In a machine of the class described an electric circuit, an accumulator for receiving items and computing totals, adjustable connections for said electric circuit, a series of graduated resistances adapted to be connected selectively in said circuit by said adjustable connections, means under control of said accumulator for adjusting said connections to vary the amount of current flowing in the circuit according to the magnitude of the item or total registered in said accumulator, and a galvanometer in said circuit adapted to make a graphical record of the item or total on a record sheet, and means for selecting said galvanometer during item entering cycles or total taking cycles.

9. In a machine of the class described an electric circuit, an accumulator for receiving items and computing totals, adjustable connections for said electric circuit, a series of graduated resistances adapted to be connected selectively in said circuit by said adjustable connections, means under control of said accumulator for adjusting said connections to vary the amount of current flowing in the circuit according to the magnitude of the item or total registered in said accumulator, and a galvanometer in said circuit adapted to make a graphical record of the item or total on a record sheet, means for closing and opening said circuit during item entering cycles, other means for closing and opening said circuit during total taking cycles, and a control switch in said circuit for selecting either of said circuit operating means to make a graph record of items or totals.

10. In a machine of the class described an electric circuit, an accumulator comprising a plurality of denominational order elements for receiving amounts, adjustable connections for said electric circuit, a series of graduated resistances adapted to be connected selectively in said circuit by said adjustable connections, separate gearing between each of said order elements and each of said adjustable connections for adjusting said connections and regulating the amount of current flowing in said circuit according to the magnitude of the multidenominational amount registered in said accumulator, a galvanometer in said circuit adapted to make a graphical record of the amounts on a record sheet, and means for feeding said sheet between operations of said accumulator and said galvanometer.

11. In a record controlled machine, an accumulator for receiving data from the records, commutator devices connected to said accumulator for adjustment thereby, contact segments in said commutator devices, graduated resistances connected to said segments and selectively connected in an electric circuit by operation of said accumulator, a galvanometer in said circuit with a moving coil adjusted differentially according to the current flow through the connected resistances, and recording means controlled by said moving coil for marking a graphical record of the data in the accumulator on a record sheet.

12. In a machine of the class described, an electric control circuit comprising a plurality of commutator devices, each adjusted according to related denomination values of item entries, and electrical resistances associated with said devices to form paths with variable current flow for said circuit, said resistances being selectively connected in said circuit by said adjusted devices to produce a current flow of a particular magnitude to correspond to the magnitude of an entered multidenominational item, a galvanometer in said circuit provided with a movable arm cooperating with a record sheet to make a graphical record of the magnitude of the items, and means for feeding the record sheet.

13. In a machine of the class described, an accumulator comprising a plurality of denominational order elements for receiving a succession of multidenominational item amounts and computing totals, means under control of said accumulator and adjusted thereby to represent progressive totals as the item amounts are received, a series of graduated resistances certain of which are selected by the adjustment of said total representing means, each accumulator order element selecting one or more resistances according to the magnitude of the total digit in the related order, graph recording means, and means under control of said progressive total means and the resistances selected thereby for controlling said graph recording means to make a graphical record of the progressive totals as the item amounts are received.

ULRICH KÖLM.

---

CERTIFICATE OF CORRECTION.

Patent No. 2,165,278.                      July 11, 1939.

ULRICH KÖLM.

It is hereby certified that error appears in the printed specification of the above numbered patent requiring correction as follows: Page 4, second column, line 4, claim 1, for the word "date" read data; line 9, claim 2, for "an effective number of" read effective a number of; line 47, claim 5, for "accummulator" read accumulator; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.